US012756447B2

(12) United States Patent
Wang et al.

(10) Patent No.: US 12,756,447 B2
(45) Date of Patent: Oct. 6, 2026

(54) BEAM FAILURE RECOVERY METHOD, APPARATUS, AND DEVICE FOR MULTI-TRANSMISSION AND RECEIVING POINTS, AND READABLE STORAGE MEDIUM

(71) Applicant: VIVO MOBILE COMMUNICATION CO., LTD., Dongguan (CN)

(72) Inventors: Chengxi Wang, Dongguan (CN); Peng Sun, Dongguan (CN); Yu Yang, Dongguan (CN); Rakesh Tamrakar, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 395 days.

(21) Appl. No.: 18/379,280

(22) Filed: Oct. 12, 2023

(65) Prior Publication Data

US 2024/0049010 A1 Feb. 8, 2024

Related U.S. Application Data

(63) Continuation of application No. PCT/CN2022/086321, filed on Apr. 12, 2022.

(30) Foreign Application Priority Data

Apr. 12, 2021 (CN) ......................... 202110390232.2

(51) Int. Cl.
*H04B 7/06* (2006.01)
*H04W 24/04* (2009.01)
(Continued)

(52) U.S. Cl.
CPC ........ *H04B 7/06964* (2023.05); *H04W 24/04* (2013.01); *H04W 24/08* (2013.01); *H04W 72/1268* (2013.01)

(58) Field of Classification Search
CPC .................................................. H04B 7/06964
See application file for complete search history.

(56) References Cited

U.S. PATENT DOCUMENTS

2021/0044342 A1 2/2021 He
2022/0104036 A1* 3/2022 Zhou .................... H04W 24/04
(Continued)

FOREIGN PATENT DOCUMENTS

CN 111543024 A 8/2020
WO 2021027185 A1 2/2021

OTHER PUBLICATIONS

AT&T, "Views on Beam Management Enhancements for Multi-TRP", 3GPP TSG RAN WG1 #104-e, e-meeting, Jan. 25-Feb. 5, 2021, R1-2100780.
(Continued)

*Primary Examiner* — Jason E Mattis
(74) *Attorney, Agent, or Firm* — The Webb Law Firm

(57) ABSTRACT

A beam failure recovery method for multi-transmission and reception points includes performing, by a terminal, a first operation in a case that beam failure occurs on at least some of multiple TRPs. The first operation includes one or more of following: measuring a candidate beam reference signal to determine a new beam; and sending a first message on one or multiple first resources. The first message includes an SR and/or a BFR MAC CE.

20 Claims, 3 Drawing Sheets

(51) Int. Cl.
*H04W 24/08* (2009.01)
*H04W 72/1268* (2023.01)

(56) References Cited

U.S. PATENT DOCUMENTS

| | | | | |
|---|---|---|---|---|
| 2023/0143378 | A1 | 5/2023 | Li | |
| 2023/0199528 | A1* | 6/2023 | Kang | H04W 24/08<br>370/328 |
| 2023/0362687 | A1* | 11/2023 | Xu | H04W 24/08 |
| 2023/0412240 | A1* | 12/2023 | Ling | H04L 5/005 |

OTHER PUBLICATIONS

VIVO, "Further discussion on MTRP multbeam enhancement", 3GPP TSG RAN WG1 #104b-e, e-meeting, Apr. 12-Apr. 20, 2021, R1-2102509.

CATT, "Enhancements on beam management for multi-TRP", 3GPP TSG RAN WG1 Meeting #104-e, e-Meeting, Jan. 25-Feb. 5, 2021, R1-2100346.

Ericsson, "On beam management enhancements for simultaneous multi-TRP transmission with multi-panel reception", 3GPP TSG-RAN WG1 Meeting #104bis-e, eMeeting, Apr. 12-20, 2021, R1-2103545.

ESA, "Discussion on GNSS position integrity error sources", 3GPP TSG RAN WG2 Meeting #111-e, Electronic meeting, Aug. 17-28, 2020, R2-2007647.

Nokia et al., "Enhancements on Beam Management for Multi-TRP/Panel Transmission", 3GPP TSG RAN WG1 #104-bis-e, e-Meeting, Apr. 12-20, 2021, R1-2103368.

Xiaomi, "Considerations on the solutions of slice based RACH configuration", 3GPP TSG-RAN2 #113e meeting, Online, Jan. 25-Feb. 5, 2021, R2-2100424.

ZTE, "Enhancements on beam management for multi-TRP", 3GPP TSG RAN WG1 Meeting #104b-e, e-Meeting, Apr. 12-20, 2021, R1-2102663.

* cited by examiner

BEAM FAILURE RECOVERY METHOD, APPARATUS, AND DEVICE FOR MULTI-TRANSMISSION AND RECEIVING POINTS, AND READABLE STORAGE MEDIUM

CROSS-REFERENCE TO RELATED APPLICATIONS

This application is a Bypass Continuation Application of International Patent Application No. PCT/CN2022/086321, filed Apr. 12, 2022, and claims priority to Chinese Patent Application No. 202110390232.2, filed Apr. 12, 2021, the disclosures of which are hereby incorporated by reference in their entireties.

BACKGROUND OF THE INVENTION

Field of the Invention

This application pertains to the field of communication technologies, and specifically relates to a beam failure recovery method, apparatus, and device for multi-transmission and reception points (MTRP), and a readable storage medium.

Description of Related Art

In multi-transmission and reception point/multi-panel (multi-TRP/multi-panel) scenarios, transmission reliability and throughput performance can be improved. For example, a terminal (user equipment (UE)) can receive the same or different data from multiple TRPs.

SUMMARY OF THE INVENTION

Embodiments of this application provide a beam failure recovery method, apparatus, and device for multi-transmission and reception points, and a readable storage medium.

According to a first aspect, a beam failure recovery method for multiple TRPs is provided, including:

performing, by a terminal, a first operation in a case that beam failure occurs on at least some of the multiple TRPs; where the first operation includes one or more of the following:

measuring a candidate beam reference signal to determine a new beam; and sending a first message on one or multiple first resources, where the first message includes a scheduling request (SR) and/or a beam failure recovery (BFR) media access control control element (MAC CE).

According to a second aspect, a beam failure recovery apparatus for multiple TRPs is provided, including:

an execution module, configured to perform a first operation in a case that beam failure occurs on at least some of the multiple TRPs; where the first operation includes one or more of the following:

measuring a candidate beam reference signal to determine a new beam; and sending a first message on one or multiple first resources, where the first message includes an SR and/or a BFR MAC CE.

According to a third aspect, a terminal is provided, including a processor, a memory, and a program stored in the memory and executable on the processor. When the program is executed by the processor, the steps of the method according to the first aspect are implemented.

According to a fourth aspect, a terminal is provided, including a processor and a communication interface, where the program is used to implement the steps of the method according to the first aspect.

According to a fifth aspect, a non-transitory readable storage medium is provided. The non-transitory readable storage medium stores a program or instructions, and when the program or instructions are executed by a processor, the steps of the method according to the first aspect are implemented.

According to a sixth aspect, a computer program/program product is provided. The computer program/program product is stored in a non-transient storage medium, and the computer program/program product is executed by at least one processor to implement the steps of the method according to the first aspect.

According to a seventh aspect, a chip is provided. The chip includes a processor and a communication interface, the communication interface is coupled to the processor, and the processor is used to run a program or instructions to implement the method according to the first aspect.

DESCRIPTION OF THE INVENTION

The following clearly describes the technical solutions in the embodiments of this application with reference to the accompanying drawings in the embodiments of this application. It is clear that the described embodiments are only some but not all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that the terms used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, "and" in this specification and claims indicates at least one of connected objects, and the symbol "/" generally indicates that the associated objects are in an "or" relationship.

It should be noted that the technologies described in the embodiments of this application are not limited to long term evolution (LTE)/LTE-Advanced (LTE-A) systems, and may also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the foregoing systems and radio technologies, and may also be used in other systems and radio technologies. In the following descriptions, a new radio (NR) system is described for an illustration purpose, and NR terms are used in most of the following descriptions, although these technologies may also be applied to other applications than an NR system application, for example, the 6-th generation (6G) communications system.

Figure 1A:
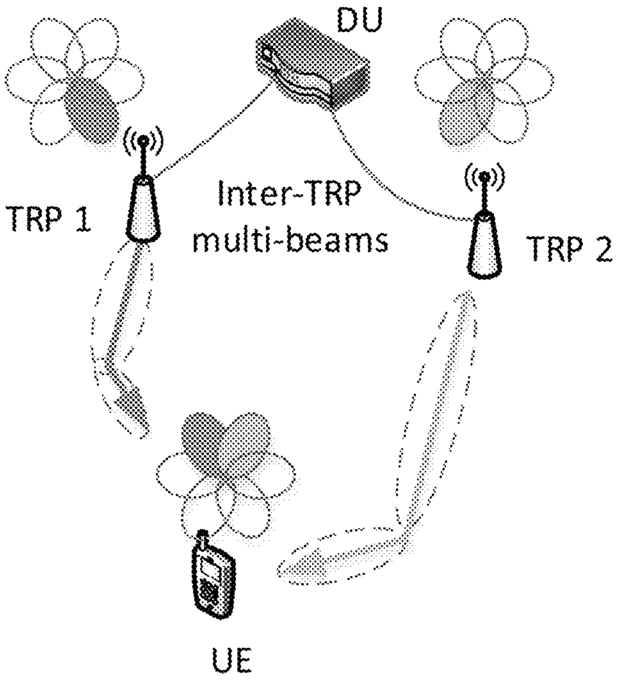
FIG. 1A is a schematic diagram of multi-TRP transmission based on ideal backhaul.
Figure 1B:
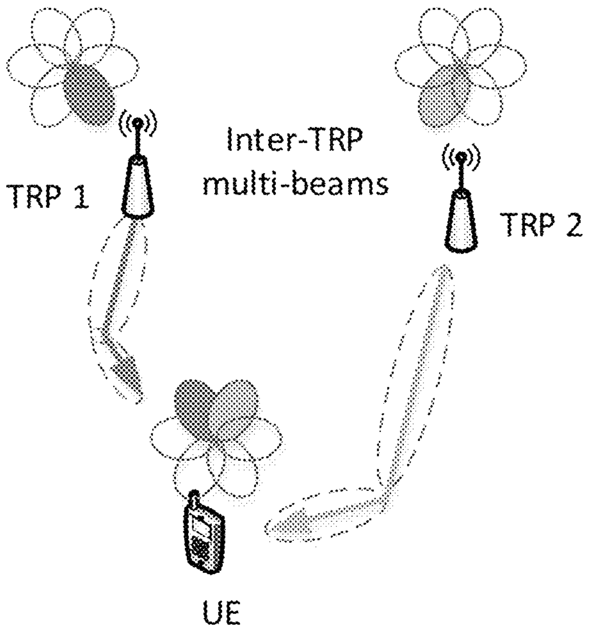
FIG. 1B is a schematic diagram of multi-TRP transmission based on non-ideal backhaul.

Transmission between multiple TRPs may be classified into ideal backhaul and non-ideal backhaul. FIG. 1A and FIG. 1B illustrate inter-TRP multi-beam (inter-TRP multi-beams) transmission. In FIG. 1A, TRP1 and TRP2 are connected to a distributed unit (DU). For non-ideal backhaul, a high latency exists for information exchange between multiple TRPs, which is suitable for independent scheduling. In this case, acknowledgement (ACK)/negative acknowledgement (NACK), and channel state information (CSI) reports are reported to each TRP separately. This is generally suitable for multi-downlink control information (DCI) scheduling. That is, each TRP transmits its own physical downlink control channel (PDCCH), each PDCCH schedules its own physical downlink shared channel (PDSCH), and multiple control resource sets (CORESET) configured for a UE are associated with different control resource set pool indexes (CORESET Pool Index) of radio resource control (RRC) and correspond to different TRPs. Multiple PDSCHs scheduled by multiple DCIs may possibly not overlap, partially overlap, or fully overlap in terms of time-frequency resources. On overlapping time-frequency resources, each TRP performs precoding independently based on its own channel, and UEs receive multi-layer data streams from multiple PDSCHs in a non-coherent joint transmission (NCJT) mode.

For ideal backhaul, scheduling information and UE feedback information can be exchanged in real time between multiple TRPs. In addition to the foregoing multi-PDSCH scheduling based on multiple DCIs, PDSCH scheduling based on a single DCI is also supported, including the following transmission schemes:

(a) space division multiplexing (SDM): different data layers of a same transport block (TB) come from NCJT transmissions of different TRPs;

(b) frequency division multiplexing (FDM): different frequency domain resources mapped from one redundancy version (RV) of one TB come from different TRPs, or different frequency domain resources mapped from different RVs of one TB come from different TRPs; and (c) time division multiplexing (TDM): multiple repetitions of different RVs of one TB, for example, repetitions in one slot or repetitions in multiple slots, come from different TRPs.

In this case, ACK/NACK feedbacks and CSI reports can be reported to any one TRP.

In a multi-TRP scenario, when beam failure occurs in some TRPs, how beam recovery is performed is an urgent problem that needs to be solved.

For better understanding of the embodiments of this application, the following technical points are first described.

(1) Beam failure recovery (BFR) mechanism for a primary cell.

In a high-frequency band communications system, because a wavelength of a wireless signal is short, signal propagation is apt to be blocked, resulting in interruption of signal propagation. Radio link reconstruction in the prior art takes a long time, so a beam failure recovery mechanism for the primary cell is introduced. The mechanism includes the following four parts.

(a) Beam failure detection (BFD). A terminal performs measurement on a beam failure detection reference signal (BFD-RS) at a physical layer, and determines, based on a measurement result, whether a beam failure event occurs. The determination criterion is: if it is detected that metrics (metric) (hypothetical physical downlink control channel block error rate (hypothetical PDCCH BLER)) of all control beams meet a preset condition (exceeding a preset threshold), a beam failure instance (BFI) is determined; and the UE physical layer reports an indication to a UE higher layer (for example, media access control (MAC) layer), where the reporting process is periodic, with the BFI reporting cycle being the shortest period of BFD-RS, with a lower limit being 2 milliseconds (ms). The UE higher layer uses a counter and a timer to count BFIs reported by the physical layer, restarts the timer each time a BFI is received, and restarts the counter when the timer expires. When the counter reaches a maximum quantity of times configured by a network, the UE determines that a beam failure event occurs.

In the prior art, the counter and timer at the MAC layer of the UE are configured for each active bandwidth part (BWP), and start-up and maintenance of the counter and timer on each BWP are independent.

(b) New candidate beam identification. The physical layer of the terminal performs measurement on the candidate beam reference signal (candidate beam RS) or new beam reference signal (new beam RS) to find a new candidate beam. This step is not necessarily performed after a beam failure event occurs, or may be performed before a beam failure event. In a case that the UE physical layer receives a request, an indication, or a notification from the UE higher layer (for example, the MAC layer), the UE physical layer reports to the UE higher layer the measurement results that meet a preset condition (measured layer 1 reference signal received power (L1-RSRP) of a candidate beam RS exceeds a preset threshold). The reported content is {beam RS index, L1-RSRP}. The UE higher layer selects a candidate beam (candidate beam) based on the report of the physical layer.

(c) Beam failure recovery request (BFRQ). The UE higher layer (for example, the MAC layer) determines a physical random access channel (PRACH) resource based on the selected candidate beam. In a case that the UE has found the candidate beam and a contention-free PRACH resource is configured for the candidate beam, the BFRQ is transmitted to a base station by using the contention-free PRACH. Otherwise, the UE may use a contention-based PRACH resource. Only the contention-based PRACH resource can be used in a case that a beam failure recovery timer expires. The total number of times of using the two types of PRACH resources cannot exceed a preset value.

(d) Beam failure recovery response (BFRR). After receiving a BFRQ, the base station will send a response on a dedicated PDCCH on the configured CORESET-BFR and carry a cell radio network temporary identifier (C-RNTI). The CORESET-BFR is spatially quasi-co-located (QCL) with a downlink (DL) RS of the candidate beam found by the UE. If BFR is unsuccessful, the UE physical layer sends an indication to the UE higher layer for the higher layer to determine a subsequent radio link failure process.

(2) Beam failure recovery mechanism for a secondary cell (SCell).

For a multi-carrier scenario (which may be understood as carrier aggregation (CA)), where there are a plurality of carriers or a plurality of component carriers (CC) or a plurality of cells, there is one primary cell (for example, a primary cell (PCell) in a master cell group (MCG), or a primary secondary cell (PSCell) in a secondary cell group (SCG)) and at least one secondary cell (Scell).

Figure 2:
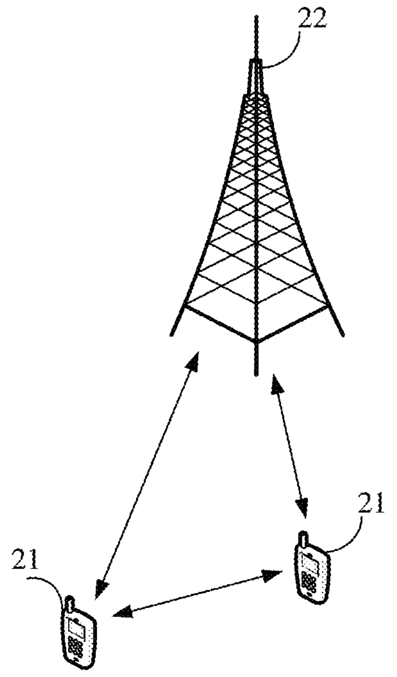
FIG. 2 is a schematic diagram of a wireless communications system to which embodiments of this application are applicable.

Referring to FIG. 2, this figure is a block diagram of a wireless communications system to which embodiments of this application are applicable. The wireless communications system includes a terminal 21 and a network-side device 22. The terminal 21 may also be referred to as a terminal device or user equipment (UE), and the terminal 21 may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a smart watch, a wrist band, earphones, glasses, or the like. It should be noted that a specific type of the terminal 21 is not limited in the embodiments of this application.

The network-side device 22 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception point (TRP), a radio access network node, or another appropriate term in the art. Provided that a same technical effect is achieved, the base station is not limited to a specific technical term. It should be noted that in the embodiments of this application, the base station in the NR system is merely used as an example, and a specific type of the base station is not limited.

Figure 3:
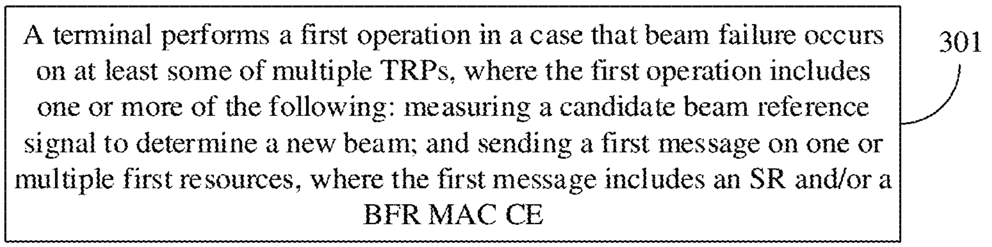
FIG. 3 is a flowchart of a multi-TRP beam failure recovery method according to an embodiment of this application.

Referring to FIG. 3, an embodiment of this application provides a multi-TRP beam failure recovery method. The steps include step 301.

Step 301. Perform, by a terminal, a first operation in a case that beam failure occurs on at least some of the multiple TRPs.

The first operation includes one or more of the following.

(1) Measuring a candidate beam reference signal to determine a new beam.

It should be noted that the candidate beam reference signal is optionally configured. That is, the network side may or may not configure the candidate beam reference signal.

(2) Sending a first message on one or multiple first resources, where the first message includes a scheduling request (SR) and/or a media access control control element containing beam failure recovery information (BFR MAC CE).

The first resource may be configured or scheduled by the network side.

In an implementation of this application, in a case that a candidate beam reference signal is configured by the network side, the candidate beam reference signal is associated with the at least some TRPs (the TRPs with beam failure).

In an implementation of this application, the TRPs are identified by one or more of the following:

(1) a beam failure detection reference signal set identifier (BFD-RS Set ID);

(2) a new beam identification reference signal set identifier (NBI-RS set ID);

(3) a control resource set pool index (CORESET Pool Index); and (4) a control resource set group identifier (CORESET Group ID).

All CORESETs configured by the network side are grouped, and the CORESET Group ID identifies each CORESET group.

In some embodiments, similar to associating the beam failure detection reference signal or candidate beam reference signal with a TRP, another channel or reference signal may also be associated with a TRP.

For example, a channel state information reference signal (CSI-RS) or a sounding reference signal (SRS) is associated with a TRP.

This may include: associating one or more of a CSI-RS resource setting, CSI-RS resource configuration (config), a CSI-RS resource set, a CSI-RS resource subset, a CSI-RS resource group, a CSI-RS resource, an SRS resource setting, SRS resource config, an SRS resource set, an SRS resource subset, or an SRS resource group with a TRP.

The CSI-RS or SRS may be used for various purposes, for example, the CSI-RS for beam management, the CSI-RS for CSI acquisition, the CSI-RS for tracking, the SRS for beam management, the SRS for codebook, the SRS for non-codebook, the SRS for antenna switching, or the like.

The association with a TRP may be implicit identifier matching performed through network configuration or protocol agreement. That is, matching is performed between identifier information of the RS configuration information and TRP identifier information. For example, CSI-RS resource set 1 corresponds to TRP identifier 0 (TRP ID0), and CSI-RS resource set 2 corresponds to TRP identifier 1 (TRP ID1); or CSI-RS resource subset 1 corresponds to TRP ID0, and CSI-RS resource subset 2 corresponds to TRP ID1; or SRS resource set 1 corresponds to TRP ID0, and SRS resource set 2 corresponds to TRP ID1, or the like.

The association with a TRP may also be explicit, and configuration information of the RS contains TRP ID information. For example, a CSI-RS resource set contains TRP ID, a CSI-RS resource subset contains TRP ID, or a SRS resource set contains TRP ID.

The TRP ID may be denoted by CORESET Pool Index.

In an implementation of this application, the multiple first resources include multiple physical uplink control channel (PUCCH) resources or uplink grant resources, and the multiple PUCCH resources or uplink grant (UL grant) resources correspond to multiple TRPs.

In an implementation of this application, the step of sending a first message on multiple first resources includes:

determining a target transmission resource among the multiple PUCCH resources or UL grant resources; and sending the first message on the target transmission resource.

The target transmission resource includes one of the following.

(1) A PUCCH resource or a UL grant resource closest to the beam failure (point of time) in time domain.

(2) A PUCCH resource or a UL grant resource associated with a TRP with beam failure.

In a case that a PUCCH resource or a UL grant resource is within a frequency range 2 (FR2), the PUCCH resource or UL grant resource is associated with at least one spatial relation, and at least one spatial relation points to a TRP without beam failure.

(3) A PUCCH resource closest to the beam failure in time domain and a PUCCH resource associated with a TRP with beam failure.

It can be understood that the PUCCH resource closest to the beam failure in time domain is different from the PUCCH resource associated with a TRP with beam failure.

(4) An uplink grant resource closest to the beam failure in time domain and an uplink grant resource associated with a TRP with beam failure.

It can be understood that the uplink grant resource closest to the beam failure in time domain is different from the uplink grant resource associated with a TRP with beam failure.

(5) An uplink resource of a TRP corresponding to a first reference signal, where the first reference signal is a reference signal with the greatest measured value or a reference signal with a measured value greater than a preset threshold. The first reference signal includes one or more of the following: BFD-RS and NBI-RS; or the measured value includes one or more of the following: layer 1 signal to interference plus noise ratio (L1-SINR) and L1-RSRP.

In an implementation of this application, the one first resource is one PUCCH resource or UL grant resource, and the one PUCCH resource or UL grant resource includes multiple pieces of spatial relation information, where the multiple pieces of spatial relation information correspond to multiple TRPs respectively.

In an implementation of this application, the step of sending a first message on one PUCCH resource or UL grant resource includes:

determining a target spatial relation for the one PUCCH resource or UL grant resource; and sending the first message based on the target spatial relation.

The target spatial relation includes one of the following:

(1) a spatial relation corresponding to a TRP without beam failure; and (2) all spatial relations for the one PUCCH resource or UL grant resource, where the first message is sent based on the all spatial relations at the same time. For example, on one PUCCH resource or UL grant resource, an SR or a BFR MAC CE is transmitted based on different spatial relations at the same time.

Alternatively, the first message is sent based on the all spatial relations in a time division mode. For example, on one periodic PUCCH resource or UL grant resource, an SR or a BFR MAC CE is transmitted based on different spatial relations.

In an implementation of this application, the first resource includes a PUCCH resource and a UL grant resource.

In an implementation of this application, the step of sending a first message on one or multiple first resources includes:

determining a target transmission resource among one or multiple PUCCH resources and uplink grant resources; and sending the first message on the target transmission resource.

The target transmission resource includes one of the following.

(1) A UL grant resource associated with a TRP with beam failure.

In a case that a UL grant resource is within FR2, the UL grant resource is associated with at least one spatial relation, and at least one spatial relation points to a TRP without beam failure.

(2) A PUCCH resource associated with a TRP with beam failure.

In a case that a PUCCH resource is within FR2, the PUCCH resource is associated with at least one spatial relation, and at least one spatial relation points to a TRP without beam failure.

(3) An uplink grant resource closest to the beam failure in time domain and a PUCCH resource associated with a TRP with beam failure.

In a case that a PUCCH resource or a UL grant resource is within FR2, the PUCCH resource or UL grant resource is associated with at least one spatial relation, and at least one spatial relation points to a TRP without beam failure.

(4) A PUCCH resource or a UL grant resource closest to the beam failure in time domain.

(5) A PUCCH resource or a UL grant resource of a TRP corresponding to a second reference signal, where the second reference signal is a reference signal with the greatest measured value or a reference signal with a measured value greater than a preset threshold.

Optionally, the second reference signal includes one or more of the following: BFD-RS and NBI-RS, or the measured value includes one or more of the following: L1-SINR and L1-RSRP.

In an implementation of this application, in a case that the candidate beam reference signal is configured by a network side, the BFR MAC CE includes one or more of the following:

(1) an identifier of a cell with beam failure;

(2) an identifier of a TRP with beam failure;

(3) indication information, used to indicate whether a new beam is found; and (4) information of a new beam.

In a case that no candidate beam reference signal is configured by the network side, or the candidate beam reference signal is configured by the network side but the terminal fails to detect a new beam meeting a threshold condition through measurement, the BFR MAC CE will indicate that no new beam is found and no information of a new beam is contained.

In an implementation of this application, in a case that no candidate beam reference signal is configured by the network side, the BFR MAC CE includes one or more of the following:

(1) an identifier of a cell with beam failure; and (2) an identifier of a TRP with beam failure.

In an implementation of this application, the method further includes:

receiving, by the terminal, a second message from a network-side device, where the second message is a response message of the first message.

In an implementation of this application, the second message and the BFRQ correspond to the same first identifier or different first identifiers, and the first identifier includes a cell identifier and/or a TRP identifier.

In an implementation of this application, in a case that the BFR MAC CE includes the information of a new beam, the method further includes:

in a case that a first PDCCH is detected, terminating, by the terminal, a beam recovery request procedure and/or resetting a beam for some channels by using the new beam; where a new data indicator (NDI) in the first PDCCH is flipped and the first PDCCH schedules a second uplink transmission, and the second uplink transmission and a BFRQ transmission have the same hybrid automatic repeat request (HARQ) process identifier;

In other words, in a case that the terminal detects that the scheduled HARQ process is the same as the BFRQ transmission and the HARQ process indicates a flipped PDCCH, the terminal terminates the beam recovery request procedure and/or resetting the beam for some channels by using the new beam.

The some channels at least include a PUCCH associated with a TRP with beam failure.

In an implementation of this application, in a case that the BFR MAC CE includes the information of a new beam, the method further includes:

in a case that the terminal receives a third message, terminating, by the terminal, a beam recovery request procedure and/or resetting a beam of a corresponding channel by using beam information indicated by the third message; where the third message is used to adjust a transmission configuration indication state (TCI) state of CORESET associated with the TRP with beam failure and/or a spatial relation configured for a PUCCH.

In other words, in a case that the terminal receives the third message used to adjust the TCI state of CORESET associated with the TRP with beam failure and/or the spatial relation configured for a PUCCH, the terminal terminates the beam recovery request procedure and/or resets the beam of a corresponding channel by using the beam information indicated by the third message.

In an implementation of this application, in a case that the BFR MAC CE does not include the information of a new beam and no candidate beam reference information is configured by the network side, the method further includes:

in a case that the terminal has detected a physical downlink control channel PDCCH for activating aperiodic CSI reporting, stopping, by the terminal, detection of a BFD-RS associated with the TRP with beam failure; where the PDCCH is associated with the TRP with beam failure.

In an implementation of this application, an association relationship between the PDCCH and the TRP with beam failure is indicated by CORESET Pool Index or CORESET Group ID.

For example, when the PDCCH reported by the activated aperiodic CSI is associated with CORESET Pool Index 1, it indicates that beam failure occurs on a PDCCH corresponding to CORESET Pool Index 0. The UE will perform aperiodic beam training on the TRP with beam failure based on information carried by the detected PDCCH and stop detecting the BFD-RS associated with CORESET Pool Index 0.

In an implementation of this application, the method further includes:

performing, by the terminal, beam measurement and/or reporting based on information carried by the PDCCH.

In an implementation of this application, the method further includes:

in a case that the terminal receives a fourth message and the fourth message is used to adjust a TCI state of CORESET associated with the TRP with beam failure and/or a spatial relation configured for a PUCCH, performing, by the terminal, a second operation, where the second operation includes one or more of the following:

(1) resetting a beam of a corresponding channel based on beam information indicated by the fourth message;

(2) updating the BFD-RS associated with the TRP with beam failure; and (3) starting detection of the BFD-RS associated with the TRP with beam failure.

Optionally, the fourth message may be RRC signaling or MAC CE signaling.

In an implementation of this application, in a case that the BFR MAC CE does not include the information of a new beam and candidate beam reference information is configured by the network side but the terminal fails to detect a new beam meeting a threshold condition through measurement, the method further includes:

receiving, by the terminal, a fifth message, where the fifth message indicates deactivation of a TRP. That is, the fifth message indicates the terminal to switch from an MTRP transmission mode to an STRP transmission mode.

Optionally, the fifth message may be RRC signaling or MAC CE signaling.

In an implementation of this application, the fifth message includes one or more of the following:

(1) first information, indicating information of the TRP with beam failure; and (2) second information, indicating value change information of CORESET Pool Index or CORESETP Group ID.

In an implementation of this application, the first information includes one or more of CORESET Pool Index, CORESETP Group ID, BFD-RS Set ID, and NBI-RS Set ID.

In an implementation of this application, the value change information of CORESET Pool Index or CORESETP Group ID includes one or more of the following:

(1) indication information of whether values of all CORESET Pool Index are the same;

(2) indication information of whether values of all CORESET Group ID are the same;

(3) a changed value of CORESET Pool Index; and (4) a changed value of CORESET Group ID.

In an implementation of this application, the method further includes:

in a case the fifth message is received, performing, by the terminal, a third operation; where the third operation includes one or more of the following:

(1) terminating one or more of reception, measurement, and uplink transmission associated with the TRP with beam failure;

(2) terminating all higher-layer behaviors associated with the TRP with beam failure;

(3) performing one or more of reception, measurement, and uplink transmission based on all resources configured by the network side; and (4) performing one or more of reception, measurement, and uplink transmission based on part of resources among all resources configured by the network side.

In this embodiment of this application, in a multi-TRP scenario, the terminal performs the first operation in a case that beam failure occurs on some TRPs, so that an interrupted beam link can be recovered quickly by the network and the terminal. This improves data transmission reliability and user experience while improving flexibility of network scheduling.

Figure 4:
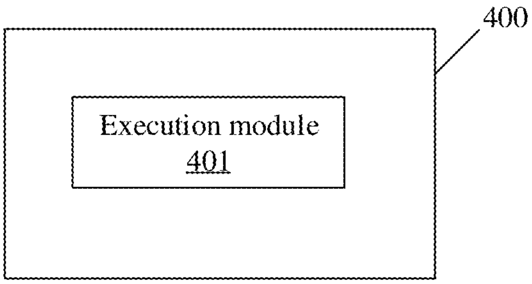
FIG. 4 is a block diagram of a multi-TRP beam failure recovery apparatus according to an embodiment of this application.

Refer to FIG. 4. An embodiment of this application provides a multi-TRP beam failure recovery apparatus, which is applied to a terminal and includes an execution module 401, configured to perform a first operation in a case that beam failure occurs on at least some of the multiple TRPs.

The first operation includes one or more of the following.

(1) Measuring a candidate beam reference signal to determine a new beam.

It should be noted that the candidate beam reference signal is optionally configured. That is, the network side may or may not configure the candidate beam reference signal.

(2) Sending a first message on one or multiple first resources, where the first message includes an SR and/or a BFR MAC CE.

The first resource may be configured or scheduled by the network side.

In an implementation of this application, in a case that a candidate beam reference signal is configured by the network side, the candidate beam reference signal is associated with the at least some TRPs (the TRPs with beam failure).

In an implementation of this application, the TRPs are identified by one or more of the following:

(1) BFD-RS Set ID;

(2) NBI-RS Set ID;

(3) CORESET Pool Index; and (4) CORESET Group ID.

All CORESETs configured by the network side are grouped, and the CORESET Group ID identifies each CORESET group.

In an implementation of this application, the multiple first resources include multiple PUCCH resources or uplink grant resources, and the multiple PUCCH resources or UL grant resources correspond to multiple TRPs.

In an implementation of this application, the step of sending a first message on multiple first resources includes:

determining a target transmission resource among the multiple PUCCH resources or UL grant resources; and sending the first message on the target transmission resource.

The target transmission resource includes one of the following.

(1) A PUCCH resource or a UL grant resource closest to the beam failure (point of time) in time domain.

(2) A PUCCH resource or a UL grant resource associated with a TRP with beam failure.

In a case that a PUCCH resource or a UL grant resource is within FR2, the PUCCH resource or UL grant resource is associated with at least one spatial relation, and at least one spatial relation points to a TRP without beam failure.

(3) A PUCCH resource closest to the beam failure in time domain and a PUCCH resource associated with a TRP with beam failure.

It can be understood that the PUCCH resource closest to the beam failure in time domain is different from the PUCCH resource associated with a TRP with beam failure.

(4) An uplink grant resource closest to the beam failure in time domain and an uplink grant resource associated with a TRP with beam failure.

It can be understood that the uplink grant resource closest to the beam failure in time domain is different from the uplink grant resource associated with a TRP with beam failure.

(5) An uplink resource of a TRP corresponding to a first reference signal, where the first reference signal is a reference signal with the greatest measured value or a reference signal with a measured value greater than a preset threshold.

The first reference signal includes one or more of the following: BFD-RS and NBI-RS, or the measured value includes one or more of the following: L1-SINR and L1-RSRP.

In an implementation of this application, the one first resource is one PUCCH resource or UL grant resource, and the one PUCCH resource or UL grant resource includes multiple pieces of spatial relation information, where the multiple pieces of spatial relation information correspond to multiple TRPs respectively.

In an implementation of this application, an execution module 401 is further configured to: determine a target spatial relation for the one PUCCH resource or UL grant resource; and send a first message based on the target spatial relation.

The target spatial relation includes one of the following:

(1) a spatial relation corresponding to a TRP without beam failure; and (2) all spatial relations for the one PUCCH resource or UL grant resource, where the first message is sent based on the all spatial relations at the same time. For example, on one PUCCH resource or UL grant resource, an SR or a BFR MAC CE is transmitted based on different spatial relations at the same time.

Alternatively, the first message is sent based on the all spatial relations in a time division mode. For example, on one periodic PUCCH resource or UL grant resource, an SR or a BFR MAC CE is transmitted based on different spatial relations.

In an implementation of this application, the first resource includes a PUCCH resource and a UL grant resource.

In an implementation of this application, the execution module 401 is further configured to: determine a target transmission resource among one or multiple PUCCH resources or uplink grant resources; and send the first message on the target transmission resource.

The target transmission resource includes one of the following.

(1) A UL grant resource associated with a TRP with beam failure.

In a case that a UL grant resource is within FR2, the UL grant resource is associated with at least one spatial relation, and at least one spatial relation points to a TRP without beam failure.

(2) A PUCCH resource associated with a TRP with beam failure.

In a case that a PUCCH resource is within FR2, the PUCCH resource is associated with at least one spatial relation, and at least one spatial relation points to a TRP without beam failure.

(3) An uplink grant resource closest to the beam failure in time domain and a PUCCH resource associated with a TRP with beam failure.

In a case that a PUCCH resource or a UL grant resource is within FR2, the PUCCH resource or UL grant resource is associated with at least one spatial relation, and at least one spatial relation points to a TRP without beam failure.

(4) A PUCCH resource or a UL grant resource closest to the beam failure in time domain.

(5) A PUCCH resource or a UL grant resource of a TRP corresponding to a second reference signal, where the second reference signal is a reference signal with the greatest measured value or a reference signal with a measured value greater than a preset threshold.

Optionally, the second reference signal includes one or more of the following: BFD-RS and NBI-RS, or the measured value includes one or more of the following: L1-SINR and L1-RSRP.

In an implementation of this application, in a case that the candidate beam reference signal is configured by a network side, the BFR MAC CE includes one or more of the following:

(1) an identifier of a cell with beam failure;

(2) an identifier of a TRP with beam failure;

(3) indication information, used to indicate whether a new beam is found; and (4) information of a new beam.

In a case that no candidate beam reference signal is configured by the network side, or the candidate beam reference signal is configured by the network side but the terminal fails to detect a new beam meeting a threshold condition through measurement, the BFR MAC CE will indicate that no new beam is found and no information of a new beam is contained.

In an implementation of this application, in a case that no candidate beam reference signal is configured by the network side, the BFR MAC CE includes one or more of the following:

(1) an identifier of a cell with beam failure;

(2) an identifier of a TRP with beam failure.

In an implementation of this application, the method further includes:

receiving, by the terminal, a second message from a network-side device, where the second message is a response message of the first message.

In an implementation of this application, the second message and the BFR MAC CE correspond to the same first identifier or different first identifiers, and the first identifier includes a cell identifier and/or a TRP identifier.

In an implementation of this application, in a case that the BFR MAC CE includes the information of a new beam, the execution module 401 is further configured to:

in a case that a first PDCCH is detected, terminate a beam recovery request procedure and/or reset a beam for some channels by using the new beam; where an NDI in the first PDCCH is flipped and the first PDCCH schedules a second uplink transmission, and the second uplink transmission and a BFRQ transmission have the same HARQ process identifier.

The some channels at least include a PUCCH associated with a TRP with beam failure.

In an implementation of this application, in a case that the BFR MAC CE includes the information of a new beam, the execution module 401 is further configured to:

in a case that the terminal receives a third message, terminate a beam recovery request procedure and/or reset a beam of a corresponding channel by using beam information indicated by the third message; where the third message is used to adjust a transmission configuration indication state TCI state of CORESET associated with the TRP with beam failure and/or a spatial relation configured for a PUCCH.

In an implementation of this application, in a case that the BFR MAC CE does not include the information of a new beam and no candidate beam reference information is configured by the network side, the execution module 401 is further configured to:

in a case that the terminal has detected a physical downlink control channel PDCCH for activating aperiodic CSI reporting, stop detection of a BFD-RS associated with the TRP with beam failure; where the PDCCH is associated with the TRP with beam failure.

In an implementation of this application, an association relationship between the PDCCH and the TRP with beam failure is indicated by CORESET Pool Index or CORESET Group ID.

For example, when the PDCCH reported by the activated aperiodic CSI is associated with CORESET Pool Index 1, it indicates that beam failure occurs on a PDCCH corresponding to CORESET Pool Index 0. The UE will perform aperiodic beam training on the TRP with beam failure based on information carried by the detected PDCCH and stop detecting the BFD-RS associated with CORESET Pool Index 0.

In an implementation of this application, the execution module 401 is further configured to perform beam measurement and/or reporting based on information carried by the PDCCH.

In an implementation of this application, the execution module 401 is further configured to: in a case that a fourth message is received and the fourth message is used to adjust a TCI state of CORESET associated with the TRP with beam failure and/or a spatial relation configured for a PUCCH, perform a second operation, where the second operation includes one or more of the following:

(1) resetting a beam of a corresponding channel based on beam information indicated by the fourth message;

(2) updating the BFD-RS associated with the TRP with beam failure; and (3) starting detection of the BFD-RS associated with the TRP with beam failure.

Optionally, the fourth message may be RRC signaling or MAC CE signaling.

In an implementation of this application, in a case that the BFR MAC CE does not include the information of a new beam and candidate beam reference information is configured by the network side but the terminal fails to detect a new beam meeting a threshold condition through measurement, the execution module 401 is further configured to: receive a fifth message, where the fifth message indicates deactivation of a TRP. That is, the fifth message indicates the terminal to switch from an MTRP transmission mode to an STRP transmission mode.

Optionally, the fifth message may be RRC signaling or MAC CE signaling.

In an implementation of this application, the fifth message includes one or more of the following:

(1) first information, indicating information of the TRP with beam failure; and (2) second information, indicating value change information of CORESET Pool Index or CORESETP Group ID.

In an implementation of this application, the first information includes one or more of CORESET Pool Index, CORESETP Group ID, BFD-RS Set ID, and NBI-RS Set ID.

In an implementation of this application, the value change information of CORESET Pool Index or CORESETP Group ID includes one or more of the following:

(1) indication information of whether values of all CORESET Pool Index are the same;

(2) indication information of whether values of all CORESET Group ID are the same;

(3) a changed value of CORESET Pool Index; and (4) a changed value of CORESET Group ID.

In an implementation of this application, the execution module 401 is further configured to: in a case the fifth message is received, perform a third operation; where the third operation includes one or more of the following:
(1) terminating one or more of reception, measurement, and uplink transmission associated with the TRP with beam failure;
(2) terminating all higher-layer behaviors associated with the TRP with beam failure;
(3) performing one or more of reception, measurement, and uplink transmission based on all resources configured by the network side; and
(4) performing one or more of reception, measurement, and uplink transmission based on part of resources among all resources configured by the network side.

The apparatus provided in this embodiment of this application can implement the processes of by the method embodiment illustrated in FIG. 3, with the same technical effects. To avoid repetition, details are not described herein again.

An embodiment of this application further provides a terminal, including a processor and a communication interface. The processor is used to perform a first operation in a case that beam failure occurs on at least some of multiple TRPs. The first operation includes one or more of the following: measuring a candidate beam reference signal to determine a new beam; and sending a first message on one or multiple first resources, where the first message includes an SR and/or a BFR MAC CE. The terminal embodiment is corresponding to the foregoing method embodiments used on the terminal side. All the implementation processes and implementation methods of the foregoing method embodiments can be applied to the terminal embodiment, with the same technical effects achieved.

Figure 5:
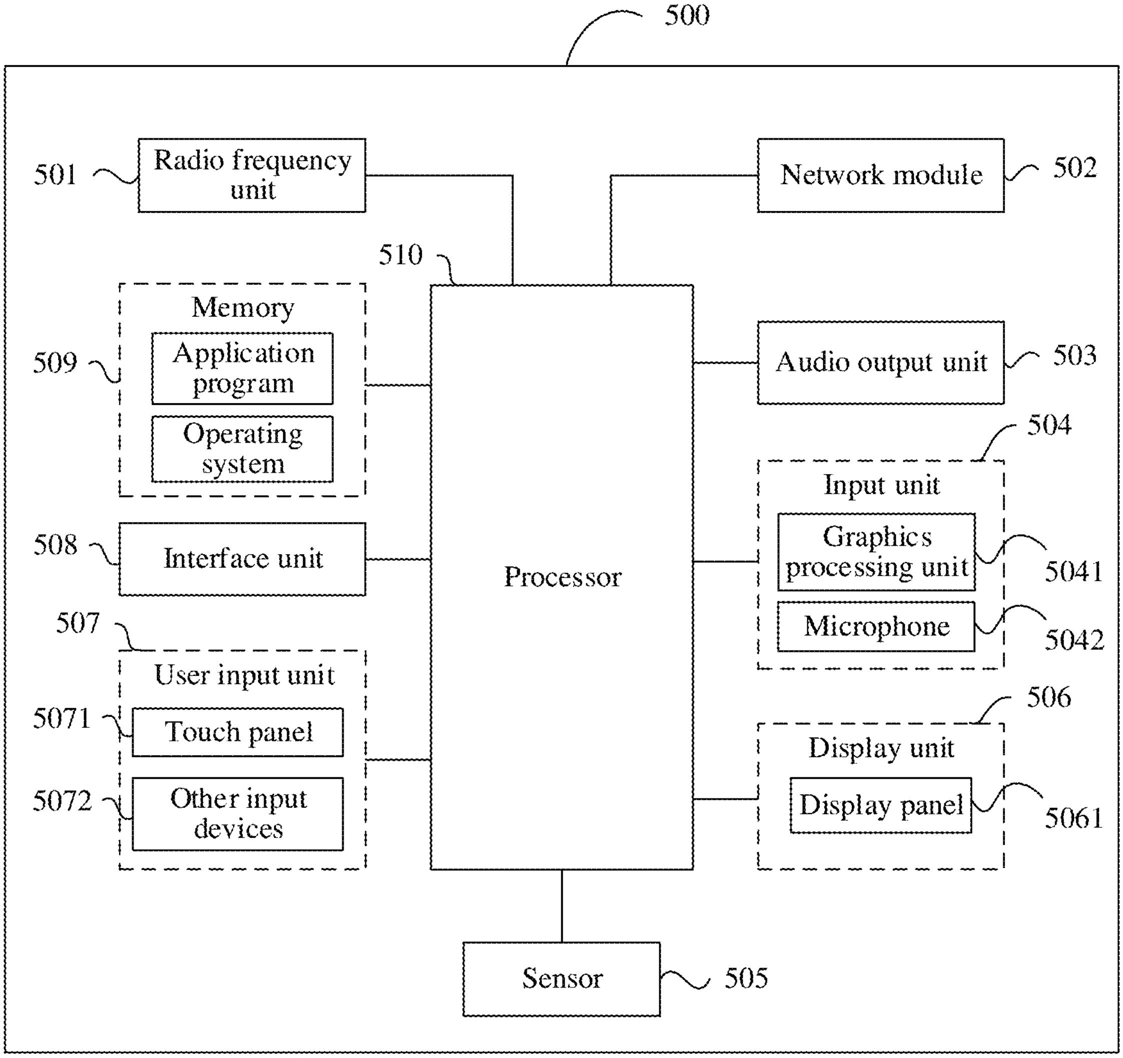
FIG. 5 is a schematic diagram of a terminal according to an embodiment of this application.

Optionally, FIG. 5 is a schematic diagram of a hardware structure of a terminal for implementing the embodiments of this application. The terminal 500 includes but is not limited to at least part of components such as a radio frequency unit 501, a network module 502, an audio output unit 503, an input unit 504, a sensor 505, a display unit 506, a user input unit 507, an interface unit 508, a memory 509, and a processor 510.

Persons skilled in the art can understand that the terminal 500 may further include a power source (for example, a battery) for supplying power to the components. The power source may be logically connected to the processor 510 through a power management system. In this way, functions such as charge management, discharge management, and power consumption management are implemented by using the power management system. The structure of the terminal shown in FIG. 5 does not constitute a limitation on the terminal. The terminal may include more or fewer components than illustrated in the figure, or combine some components, or have a different component arrangement. Details are not described herein.

It should be understood that in the embodiments of this application, the input unit 504 may include a graphics processing unit (GPU) 5041 and a microphone 5042. The graphics processing unit 5041 processes image data of a static picture or a video that is obtained by an image capture apparatus (for example, a camera) in a video capture mode or an image capture mode. The display unit 506 may include a display panel 5061. The display panel 5061 may be configured in a form of a liquid crystal display, an organic light-emitting diode, or the like. The user input unit 507 includes a touch panel 5071 and other input devices 5072. The touch panel 5071 is also referred to as a touch screen. The touch panel 5071 may include two parts: a touch detection apparatus and a touch controller. The other input devices 5072 may include but are not limited to a physical keyboard, a functional button (such as a volume control button or a power on/off button), a trackball, a mouse, and a joystick. Details are not described herein.

In the embodiments of this application, the radio frequency circuit 501 receives downlink data from the network-side device for processing by the processor 510, and sends uplink data to the network-side device. Generally, the radio frequency unit 501 includes but is not limited to an antenna, at least one amplifier, a transceiver, a coupler, a low noise amplifier, a duplexer, and the like.

The memory 509 may be configured to store software programs or instructions, and various data. The memory 509 may mainly include a program or instruction storage area and a data storage area. The program or instruction storage area may store an operating system, an application program or instructions required by at least one function (for example, an audio playing function and an image playing function), and the like. In addition, the memory 509 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one magnetic disk storage device, a flash storage device, or another volatile solid-state storage device.

The processor 510 may include one or more processing units. Optionally, the processor 510 may integrate an application processor and a modem processor. The application processor mainly processes an operating system, a user interface, an application program or instructions, and the like. The modem processor mainly processes wireless communications, for example, a baseband processor. It should be understood that alternatively, the modem processor may not be integrated into the processor 510.

The terminal provided in this embodiment of this application can implement the processes of the method embodiment illustrated in FIG. 3, with the same technical effects. To avoid repetition, details are not described herein again.

An embodiment of this application further provides a computer program/program product. The computer program/program product is stored in a non-volatile storage medium, and the computer program/program product is executed by at least one processor to implement the steps of the method illustrated in FIG. 3.

An embodiment of this application further provides a non-transitory readable storage medium. The non-transitory readable storage medium stores a program or instructions, and when the program or instructions are executed by a processor, the processes of the method embodiment illustrated in FIG. 3 are implemented, with the same technical effects. To avoid repetition, details are not described herein again.

The processor is the processor in the terminal in the foregoing embodiments. The non-transitory readable storage medium includes a non-transitory computer-readable storage medium such as a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions to implement the processes of the method embodiment illustrated in FIG. 3, with the same technical effects achieved. To avoid repetition, details are not described herein again.

It should be understood that the chip mentioned in this embodiment of this application may also be referred to as a system-level chip, a system chip, a chip system, a system-on-chip, or the like.

An embodiment of this application further provides a computer program product, where the computer program product is stored in a non-transitory readable storage medium. The computer program product is executed by at least one processor to implement the processes of the method embodiment illustrated in FIG. 3, with the same technical effects achieved. To avoid repetition, details are not described herein again.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a computer software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing embodiments. The foregoing embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A beam failure recovery method for multiple transmission and reception points, comprising:

performing, by a terminal, a first operation in a case that beam failure occurs on at least some of multiple transmission and reception points (TRPs); wherein the first operation comprises:

sending a first message on one or multiple first resources, wherein the first message comprises a media access control control element containing beam failure recovery information (BFR MAC CE); wherein in a case that the BFR MAC CE does not comprise information of a new beam and no candidate beam reference information is configured by a network side, the method further comprises:

in a case that the terminal has detected a physical downlink control channel (PDCCH) for activating aperiodic channel state information (CSI) reporting, stopping, by the terminal, detection of a beam failure detection reference signal (BFD-RS) associated with a TRP with beam failure; wherein the PDCCH is associated with the TRP with beam failure.

2. The method according to claim 1, wherein a TRP is identified by one or more of following:

a beam failure detection reference signal set identifier (BFD-RS Set ID);

a new beam identification reference signal set identifier (NBI-RS set ID);

a control resource set pool index (CORESET Pool Index); and a control resource set group identifier (CORESET Group ID).

3. The method according to claim 1, wherein the multiple first resources comprise multiple physical uplink control channel (PUCCH) resources or uplink grant resources, and the multiple PUCCH resources or uplink grant resources correspond to multiple TRPs.

4. The method according to claim 3, wherein the sending a first message on multiple first resources comprises:

determining a target transmission resource among the multiple PUCCH resources or uplink grant resources; and sending the first message on the target transmission resource; wherein the target transmission resource comprises one of following:

a PUCCH resource or an uplink grant resource closest to the beam failure in time domain;

a PUCCH resource or an uplink grant resource associated with a TRP with beam failure;

a PUCCH resource closest to the beam failure in time domain and a PUCCH resource associated with a TRP with beam failure;

an uplink grant resource closest to the beam failure in time domain and an uplink grant resource associated with a TRP with beam failure; and an uplink resource of a TRP corresponding to a first reference signal, wherein the first reference signal is a reference signal with the greatest measured value or a reference signal with a measured value greater than a preset threshold.

5. The method according to claim 1, wherein the one first resource is one PUCCH resource or uplink grant resource, and the one PUCCH resource or uplink grant resource comprises multiple pieces of spatial relation information, wherein the multiple pieces of spatial relation information correspond to multiple TRPs respectively.

6. The method according to claim 5, wherein the sending a first message on one PUCCH resource or uplink grant resource comprises:

determining a target spatial relation for the one PUCCH resource or uplink grant resource; and sending the first message based on the target spatial relation; wherein the target spatial relation comprises one of following:

a spatial relation corresponding to a TRP without beam failure; and all spatial relations for the one PUCCH resource or uplink grant resource, wherein the first message is sent based on the all spatial relations at the same time, or the first message is sent based on the all spatial relations in a time division mode.

7. The method according to claim 1, wherein in a case that the candidate beam reference signal is configured by a network side, the BFR MAC CE comprises one or more of following:

an identifier of a cell with beam failure;

an identifier of a TRP with beam failure;

indication information, wherein the indication information is used to indicate whether a new beam is found; and information of a new beam;

or, in a case that no candidate beam reference signal is configured by a network side, the BFR MAC CE comprises one or more of following:

an identifier of a cell with beam failure; and an identifier of a TRP with beam failure.

8. The method according to claim 1, wherein the method further comprises:

receiving, by the terminal, a second message from a network-side device, wherein the second message is a response message of the first message; wherein the second message and the BFR MAC CE correspond to the same first identifier or different first identifiers, and the first identifier comprises a cell identifier and/or a TRP identifier.

9. The method according to claim 7, wherein in a case that the BFR MAC CE comprises the information of the new beam, the method further comprises:

in a case that a first physical downlink control channel (PDCCH) is detected, terminating, by the terminal, a beam recovery request procedure and/or resetting a beam for some channels by using the new beam; wherein a new data indicator (NDI) in the first PDCCH is flipped and the first PDCCH schedules a second uplink transmission, and the second uplink transmission and a beam failure recovery request (BFRQ) transmission have the same hybrid automatic repeat request (HARQ) process identifier;

or, in a case that the terminal receives a third message, terminating, by the terminal, a beam recovery request procedure and/or resetting a beam of a corresponding channel by using beam information indicated by the third message; wherein the third message is used to adjust a transmission configuration indication state (TCI state) of CORESET associated with the TRP with beam failure and/or a spatial relation configured for a PUCCH.

10. The method according to claim 7, wherein an association relationship between the PDCCH and the TRP with beam failure is indicated by CORESET Pool Index or CORESET Group ID.

11. The method according to claim 7, wherein the method further comprises:

performing, by the terminal, beam measurement and/or reporting based on information carried by the PDCCH.

12. The method according to claim 7, wherein the method further comprises:

in a case that the terminal receives a fourth message and the fourth message is used to adjust a TCI state of CORESET associated with the TRP with beam failure and/or a spatial relation configured for a PUCCH, performing, by the terminal, a second operation, wherein the second operation comprises one or more of following:

resetting a beam of a corresponding channel based on beam information indicated by the fourth message;

updating the BFD-RS associated with the TRP with beam failure; and starting detection of the BFD-RS associated with the TRP with beam failure.

13. The method according to claim 7, wherein in a case that the BFR MAC CE does not comprise the information of the new beam, the candidate beam reference information is configured by the network side, and the terminal fails to detect a new beam meeting a threshold condition through measurement, the method further comprises:

receiving, by the terminal, a fifth message, wherein the fifth message indicates deactivation of a TRP; wherein the fifth message comprises one or more of following:

first information, indicating information of the TRP with beam failure; and second information, indicating value change information of CORESET Pool Index or CORESETP Group ID.

14. The method according to claim 13, wherein the first information comprises one or more of CORESET Pool Index, CORESETP Group ID, BFD-RS Set ID, and NBI-RS Set ID.

15. The method according to claim 13, wherein the value change information of CORESET Pool Index comprises one or more of following:

indication information of whether values of all CORESET Pool Index are the same; and a changed value of CORESET Pool Index;

or, the value change information of CORESETP Group ID comprises one or more of following:

indication information of whether values of all CORESET Group ID are the same; and a changed value of CORESET Group ID.

16. The method according to claim 13, wherein the method further comprises:

in a case the fifth message is received, performing, by the terminal, a third operation; wherein the third operation comprises one or more of following:

terminating one or more of reception, measurement, and uplink transmission associated with the TRP with beam failure;

terminating all higher-layer behaviors associated with the TRP with beam failure;

performing one or more of reception, measurement, and uplink transmission based on all resources configured by the network side; and performing one or more of reception, measurement, and uplink transmission based on part of resources among all resources configured by the network side.

17. A terminal, comprising a processor, a memory, and a program stored in the memory and executable on the processor, wherein the program, when executed by the processor, causes the terminal to perform:

performing a first operation in a case that beam failure occurs on at least some of multiple transmission and reception points (TRPs); wherein the first operation comprises:

sending a first message on one or multiple first resources, wherein the first message comprises a media access control control element containing beam failure recovery information (BFR MAC CE); wherein in a case that the BFR MAC CE does not comprise information of a new beam and no candidate beam reference information is configured by a network side, the program, when executed by the processor, causes the terminal to further perform:

in a case that the terminal has detected a physical downlink control channel (PDCCH) for activating aperiodic channel state information (CSI) reporting, stopping detection of a beam failure detection reference signal (BFD-RS) associated with a TRP with beam failure; wherein the PDCCH is associated with the TRP with beam failure.

18. The terminal according to claim 17, wherein a TRP is identified by one or more of following:

a beam failure detection reference signal set identifier (BFD-RS Set ID);

a new beam identification reference signal set identifier (NBI-RS set ID);

a control resource set pool index (CORESET Pool Index); and a control resource set group identifier (CORESET Group ID).

19. The terminal according to claim 17, wherein the multiple first resources comprise multiple physical uplink control channel (PUCCH) resources or uplink grant resources, and the multiple PUCCH resources or uplink grant resources correspond to multiple TRPs.

20. A non-transitory computer readable storage medium, wherein the non-transitory computer readable storage medium stores a program or instructions, and the program or instructions, when executed by a processor of a terminal, causes the terminal to perform:

performing a first operation in a case that beam failure occurs on at least some of multiple transmission and reception points (TRPs); wherein the first operation comprises:

sending a first message on one or multiple first resources, wherein the first message comprises a media access control control element containing beam failure recovery information (BFR MAC CE); wherein in a case that the BFR MAC CE does not comprise information of a new beam and no candidate beam reference information is configured by a network side, the program or instructions, when executed by a processor of a terminal, causes the terminal to further perform:

in a case that the terminal has detected a physical downlink control channel (PDCCH) for activating aperiodic channel state information (CSI) reporting, stopping detection of a beam failure detection reference signal (BFD-RS) associated with a TRP with beam failure; wherein the PDCCH is associated with the TRP with beam failure.

* * * * *